Patented Jan. 3, 1928.

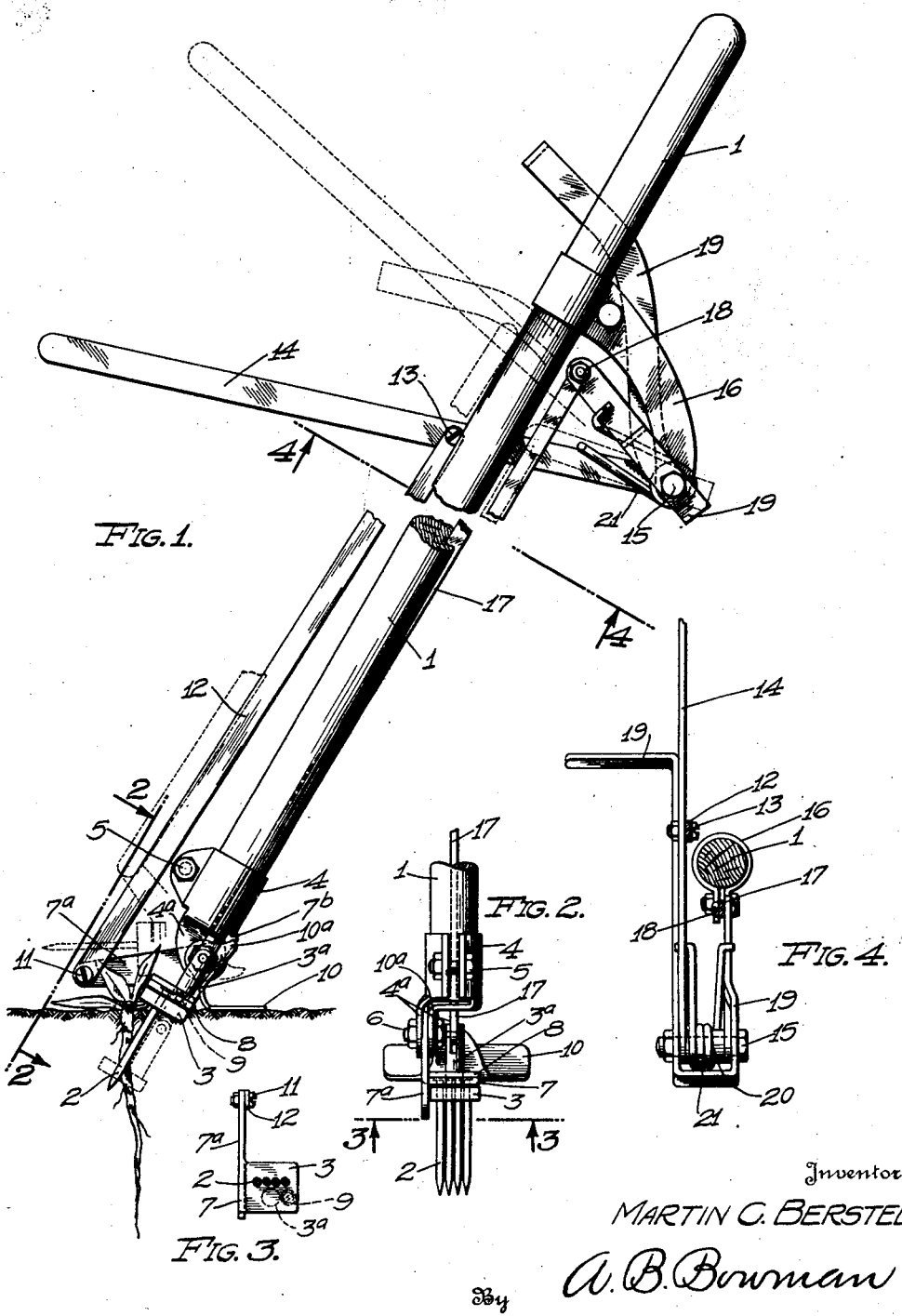

1,654,780

UNITED STATES PATENT OFFICE.

MARTIN C. BERSTED, OF SAN DIEGO, CALIFORNIA.

WEED-PULLING DEVICE.

Application filed October 5, 1925. Serial No. 60,472.

My invention relates to a device for pulling weeds, although the same may be adapted for other similar uses, and the objects of my invention are: first, to provide a device of this class for pulling or extracting weeds and the like from a distance or without stooping or getting into any other inconvenient or uncomfortable position; second, to provide a device of this class which may be gripped at its one end by the hand and inserted into the ground at its opposite end near the weeds or the like to be pulled out, the weeds or the like being pulled out or extracted by a suitable means at the gripping end of the device; third, to provide a device of this class having prongs at its one end adapted to be inserted into the ground at one side of a weed or the like around the roots thereof, said prongs being shiftable upwardly out of the ground, pulling the root with the prongs, the latter being actuated by a means at the handle portion of the device; fourth, to provide a device of this class having shiftable root extracting prongs at one end and shiftable means in connection with said prongs for forcing the root therefrom when the same has been pulled up or extracted; fifth, to provide a device of this class having pivotally mounted root clinching and extracting prongs at one end and means on said prongs for removing the root therefrom when the same has been extracted from the ground, said means being also shiftably mounted about the same pivotal axis of the prongs; sixth, to provide a device of this class having weed clinching and extracting prongs at one end and a means in connection therewith for removing the weeds therefrom after the same have been extracted, said prongs and said means being actuated by handle means at the grip portion of the device; seventh, to provide novel means in connection with a device of this class having resilient piercing and clinching means for frictionally clinching the roots adapted to be extracted; eighth, to provide a novelly constructed piercing and root clinching means in connection with a device of this class; ninth, to provide as a whole a novelly constructed device for pulling weeds and the like, and tenth, to provide a device of this class which is simple and economical of construction, durable, efficient, and which will not readily deteriorate or get out of order.

With these and other objects in view, as will appear hereinafter, my invention consists of certain novel features of construction combination and arrangement of parts and portions, as will be hereinafter described in detail and particularly set forth in the appended claims, reference being had to the accompanying drawings and to the characters of reference thereon, which form a part of this application, in which:

Figure 1 is a fragmentary side view of my device, shown in operative position on the ground for pulling up weeds, and showing the several members thereof by dotted lines in certain shifted positions; Fig. 2 is a fragmentary front view of the weed extracting end thereof, the view being taken at 2—2 of Fig. 1; Fig. 3 is a sectional end view thereof, taken through 3—3 of Fig. 2, and Fig. 4 is a fragmentary sectional view thereof, taken through 4—4 of Fig. 1.

Like characters of reference refer to similar parts and portions throughout the several views of the drawings.

My device consists essentially of a long handle member 1, prongs 2 shiftably mounted at the one end thereof, a prong cleaning member 3 in connection with the prongs, and spring controlled lever means near the grip portion of the handle member 1 for actuating the prongs and prong cleaning member.

At the normally lower end of the handle member 1 is secured, by means of a bolt 5, a journal member or clip 4, which is provided at its one side and end with a pair of spaced apart, outwardly or downwardly extending lugs 4$^a$. Between the lugs 4$^a$ is pivotally mounted, by means of a bolt 6, a prong support 7, which is bent backwardly at its forward or lower end substantially in alinement with the handle member 1. The backwardly bent right angle portion of the support 7 is provided with a plurality of holes through which extends a plurality of wire prongs 2, which extend forwardly or downwardly with their pointed forward or lower ends from the support 7. These prongs are spaced apart and are sufficiently resilient so that when the device is inserted into the ground against a root of a weed to be pulled, the separate prongs spread apart straddling or clinching the root of the weed permitting the same to be withdrawn from the ground without breaking the same, substantially as shown in Fig. 1. The prongs 2 are provided with heads at their inner ends, which are retained in position against the inner side of the right angle portion of the support 7 by means of a retaining plate 8, the retaining plate being secured to the support 7 by means of a screw 9, as shown in Figs. 1 and 3.

On the bolt 6 is also pivotally mounted a foot plate 10 shaped, substantially as shown in Figs. 1 and 2, for guiding the pronged end of the device, and adapted also to limit the insertion of the prongs into the ground. The lug or portion of the foot plate 10, supporting the same on the bolt 6, is provided with a lug 10$^a$ adapted to engage the clip 4 for limiting the backward tilting or shifting of the same.

The support 7 is provided with a forwardly extending arm 7$^a$ for shifting the prongs about their pivotal supports, the outer end of the arm 7$^a$ being pivotally connected, by means of a screw 11, with the one end of a link 12, which is pivotally connected at its opposite end, by means of a screw 13, intermediate the ends of a prong actuating lever 14, which is pivotally connected at its one or rear end on a bolt 15 supported at the lower or rear end of a bracket 16 secured to the handle member 1 intermediate its ends at a slight distance forwardly of the grip portion thereof, as shown in Fig. 1.

The prong support 7 is provided with a lug 7$^b$ at the opposite side of its pivotal axis from the arm 7$^a$, which is adapted to limit the forward position of the arm 7$^a$ or the alinement of the prongs 2 with the handle member 1, as shown best in Fig. 1.

When the device is inserted into the ground around the roots of a weed, as described, the lever 14 is pulled backwardly to the dotted line position, which shifts the prongs to the dotted line position, also shown in Fig. 1, extracting the weed from the ground.

Around the prongs 2 and forwardly of the support 7 is reciprocally mounted the prong cleaning member 3, which is provided with a backwardly or upwardly extending plunger 3$^a$, which extends through the right angle portion of the support 7 and through the plate 8. To the end of the plunger 3$^a$ is pivotally connected the one end of a link or rod 17, which is pivotally connected at its opposite end, by means of a bolt 18, to the one end of a U-shaped lever 19. It will be here noted that the pivotal connection of the plunger 3$^a$ and the link 17 is on the same axis as the pivotal axis of the support 7, so that when the prongs 2 are shifted about their pivotal axis, the prong cleaning member is shifted therewith. It will be further noted that the portion of the link 17 connected with the plunger 3$^a$ is slightly smaller than the diameter of the plunger, so that the forward end of the link will readily pass through the holes in the plate 8 and the support 7 when the prong cleaning member is shifted to the dotted line position, shown in Fig. 1. The handle member 1 is preferably provided with a longitudinal groove at its under side to receive the link 17 and support the forward end thereof within the clip 4.

The U-shaped lever 19 is pivotally mounted on the bolt 15 at the U portion of the former, thus straddling the end of the bracket 16 and the pivotal end of the lever 14. Around the bolt 15 and between the bracket 16 and the lever 14 is a spacer 20 around which is supported a torsional coil spring 21 provided with extended ends engaging the levers 14 and 19 at a distance from their pivotal axes for normally retaining the prongs 2 and the prong cleaning member 3 in the positions shown by solid lines.

When the weed is pulled from the ground, the lever 14 is released and permitted to be shifted to its solid line position, and the lever 19 is then shifted forwardly to its dotted line position, which shifts the prong cleaning member 3 to near the pointed ends of the prongs and forces the weed or other substances clinched therebetween from the prongs. The lever 19 is then released and permitted to shift to its solid line position.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a device of the class described, a handle means, prongs, adapted to be inserted into the ground, shiftably mounted at the one end thereof, means mounted on said handle means for intermittently shifting said prongs to an extracting position above the ground while holding said handle means stationary, and means in connection with said prongs for cleaning the same.

2. In a device of the class described, a handle means, prongs pivotally mounted at the one end thereof on an axis stationary relative to the handle means, and means in connection with said prongs and shiftable therewith and relative to said handle means for cleaning the prongs.

3. In a device of the class described, a handle means, a plurality of spaced apart, pointed, resilient prongs positioned in substantially the same plane and pivotally mounted at one end thereof, and a prong cleaning member reciprocally mounted on said handle means and on and around said prongs and shiftable therewith for cleaning the latter.

4. In a device of the class described a handle means, an extracting means pivotally mounted at one end thereof on an axis stationary relative to the handle means, and an extracting means cleaning member in connection with said extracting means for cleaning the same.

5. In a device of the class described, a handle means, a plurality of spaced apart, pointed, resilient prongs positioned in substantially the same plane and pivotally mounted at one end thereof, a prong cleaning member reciprocally mounted on and around said prongs and shiftable therewith for cleaning the same, and lever means on said handle means for actuating said prongs and said prong cleaning member.

6. In a device of the class described, a handle means, an extracting means pivotally mounted as a unit on a single axis at one end thereof, an extracting means cleaning member in connection with said extracting means for cleaning the same, and lever means on said handle means for actuating said extracting means and said extracting means cleaning member.

7. In a device of the class described, a handle member, prongs pivotally mounted at one end thereof, a lever means pivotally supported near the opposite end of said handle member and pivotally connected with said prongs, and a prong cleaning member reciprocally mounted in connection with said prongs and shiftable therewith, and another lever means pivotally mounted near said first mentioned lever means and pivotally connected with said prong cleaning member on the same pivotal axis of said prongs.

8. In a device of the class described, a handle member, prongs pivotally mounted near one end thereof, a prong cleaning member reciprocally mounted on said prongs, and lever means near the opposite end of said handle member pivotally connected with said prongs and with said prong cleaning member.

9. In a device of the class described, a handle member, prongs pivotally mounted near one end thereof, a prong cleaning member reciprocally mounted on said prongs, and lever means near the opposite end of said handle member pivotally connected with said prongs and with said prong cleaning member, said cleaning member being connected with said lever means on the same pivotal axis as the pivotal axis of said prongs.

10. In a device of the class described, a handle means, an extracting means pivotally mounted at one end thereof, an extracting means cleaning member in connection with said extracting means for cleaning the same, and a foot plate pivotally mounted at said one end of the handle means for limiting said extracting means and for guiding the same.

11. In a device of the class described, a handle member, prongs pivotally mounted near one end thereof, a prong cleaning member reciprocally mounted on said prongs, lever means near the opposite end of said handle member pivotally connected with said prongs and with said prong cleaning member, said cleaning member being connected with said lever means on the same pivotal axis as the pivotal axis of said prongs, and a foot plate pivotally mounted at the one end of said handle member contiguous to said prongs for limiting the insertion of the same.

In testimony whereof, I have hereunto set my hand at San Diego, California, this 22nd day of September, 1925.

MARTIN C. BERSTED.